United States Patent [19]

Frielingsdorf

[11] 4,390,358
[45] Jun. 28, 1983

[54] METHOD AND APPARATUS FOR THE TRANSPORT OF GLASS PANES

[76] Inventor: Horst Frielingsdorf, Am Meisenhort 2, 5630 Remscheid 11, Fed. Rep. of Germany

[21] Appl. No.: 362,124

[22] Filed: Mar. 26, 1982

[30] Foreign Application Priority Data

Apr. 3, 1981 [DE] Fed. Rep. of Germany ....... 3113409

[51] Int. Cl.³ .............................................. C03B 25/08
[52] U.S. Cl. ........................................ 65/111; 65/118; 65/119; 65/163; 65/348; 65/351
[58] Field of Search .................. 65/111, 118, 119, 163, 65/351, 348

[56] References Cited

U.S. PATENT DOCUMENTS

| 3,806,312 | 4/1974 | McMaster et al. | 65/118 X |
| 4,356,912 | 11/1982 | Nitschke | 65/163 X |
| 4,360,374 | 11/1982 | Nitschke | 65/348 X |

*Primary Examiner*—Arthur D. Kellogg
*Attorney, Agent, or Firm*—Karl F. Ross; Herbert Dubno

[57] ABSTRACT

A traveling grate for hot glass prevents sagging of the glass by displacing the grate at a velocity different from the angular velocity imparted to the grate rollers in the opposite direction so that the translatory velocity imparted to the glass is an algebraic summation of the grate velocity and $\omega R$ where $\omega$ is the angular velocity of the rollers and R is the radius thereof.

10 Claims, 5 Drawing Figures

METHOD AND APPARATUS FOR THE TRANSPORT OF GLASS PANES

FIELD OF THE INVENTION

The present invention relates to a method of and to an apparatus for the treatment of glass panes, plates and sheets. More particularly, the apparatus relates to an apparatus for the transport of glass panes associated with a heat treatment thereof which may result in some softening of the glass.

BACKGROUND OF THE INVENTION

In the production of glass panes, plates and sheets (hereinafter "panes" or "bodies"), it is frequently necessary to handle the glass body after it has been heated or during the heating thereof, e.g. in association with a heating treatment for prestressing or destressing the glass panes.

Thus, it is a common practice to provide a treatment station, e.g. a kiln, furnace or oven or a cooling chamber, through which the glass panes are displaced on a roller grate. A roller grate is a conveyor and can be an endless conveyor passing around direction-change drums, rollers or sprockets at opposite ends so as to form an upper pass and a lower pass, the endless member being provided with spaced-apart rollers or rolls which carry the glass panes on the upper pass.

In the heat treatment of glass panes, the glass is warmed to a temperature which may exceed the softening temperature so that the weight of the glass itself can cause the glass pane to sag between supported locations.

In order to prevent or reduce such sag (see German Pat. No. 704,219), means is provided to impart a back-and-forth movement to the pane-supporting rollers.

When the treatment is completed this back-and-forth movement is terminated and the non-rotated rollers move at the speed of the grate in translation to withdraw the treated glass panes from the station.

The grate may be used to displace the glass panes into the treatment station, may be immobilized while the glass panes are in the treatment station (while the rollers receive a back-and-forth angular displacement), and may carry the glass panes after treatment from the station.

With the conveyor approach, however, it is not possible simultaneously to avoid sag and carry out a continuous treatment of the glass pane, i.e. a continuous movement of the glass panes through the treating station. In other words, treatments using grates or conveyors have hitherto required an interruption of the movement of the glass panes through the treatment stage or in the displacement of the grate. Furthermore, rather complex means was required for imparting the back-and-forth angular displacement to the rollers during the phases in which the grate was immobilized. With renewed movement of the grate to carry the glass panes out of the treatment stage, the danger of sagging again presented itself, especially when the glass panes were subjected to very high temperatures during the treatment.

The treatment chamber, generally an oven, then had to be operated at lower temperatures than would be otherwise desirable.

Mention should also be made of the fact that it is known to provide apparatus for the treatment of hot glass panes, for the heat treatment of glass panes and especially prestressing devices for glass panes, in which the glass panes are displaced only by rotation of rollers driven at a predetermined angular speed which can be continuous or stepped so that the glass panes move with a speed in the transport direction, which corresponds to the product of the roller radius and the angular velocity of the glass panes. In this case as well, sagging could and usually did occur unless the transport velocity was made unusually high.

Of course, an important disadvantage of high linear transport speed for the glass panes is that the treatment stages must be made correspondingly longer for a given residence time and the extremely long units which must be used are many times more expensive and difficult to control.

OBJECTS OF THE INVENTION

It is the principal object of the present invention to provide an apparatus for the purposes described which allows for continuous displacement of glass panes through a treatment stage in a heated condition of the panes, whereby sagging is avoided between the supporting rollers.

Another object of this invention is to provide a transport system for heated glass panes whereby the disadvantages of earlier systems are avoided.

Still another object of the invention is to provide an improved method of operating a transport system for glass panes, especially through a heating unit such as an oven or furnace whereby sagging of the glass between rollers is prevented.

SUMMARY OF THE INVENTION

These objects and others which will become apparent hereinafter are attained in a treatment system according to the invention wherein the roller grate is displaced continuously at a translatory velocity $V_{grate}$ while the support rollers are rotated about their axes with angular velocities $-\omega$ such that a linear velocity component $\omega R$ is imparted to the glass pane, where R is the radius of the roller and $\omega R$ is different from the grate. The velocity component $\omega R$, moreover, is opposite the component $V_{grate}$ so that the difference $V_{grate} - \omega R$, where $V_{grate}$ is greater than $\omega R$, defines the translatory velocity $V_{trans}$ of the glass panes through and downstream from the treatment stage. In another embodiment of the invention, where $\omega R$ is greater the $V_{grate}$, the translatory velocities $V_{trans}$ and the transport direction of the glass pane will be opposite the direction of displacement of the grate.

While the displacement of the rollers can be effected by any means consistent with the above description it has been found to be advantageous to mount the axially spaced rollers upon common shafts so as to enable them to rotate with the shafts. Each of the shafts can be provided with a sprocket wheel which meets an endless chain as the sprockets rise to the upper path, this endless chain being driven independently of the drive of the grate.

Naturally, it is also possible to provide individual drive motors for each of the shafts. This drive motor can be electrically energized.

Whether a common drive is provided for all of the rollers of the upper pass, or individual drives are provided for each shaft, it has been found to be desirable to find means for controlling and varying the speed. It has also been found to be advantageous to provide means for varying the speed of the grate.

When the linear speed of the roller-driven conveyor is equal to the translatory velocity of the glass panes and the sprockets have the effective radius R of the rollers, the rollers will be rotated about their respective axes at the angular velocity $\omega$.

In the case where the sprocket radius does not correspond to the roller radius, the relationship between the translatory velocity of the glass panes and the speed of the roller-drive conveyor will be in a ratio determined by the ratio of the radii. The rollers can, if sprocket drive systems are not convenient, be driven with special roller sections which can engage the drive conveyor which can be a belt.

Since the velocity $V_{grate}$ and the roller drive velocity $\omega R = V_r$ can be selected freely, it is also possible to select these parameters such that the glass pane can be brought to a standstill in the treatment stage.

The principal advantage of the present invention is that glass panes can be processed in one or more treatment stages at linear velocities which are determined by the processing to which the glass is to be subjected, while nevertheless excluding sag because there is also relative movement of the glass pane and the contact surfaces formed by the rollers. Even comparatively high grate velocities can be used without necessarily requiring long treatment stages, since the linear velocity of the glass panes need not correspond to the grate velocity.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
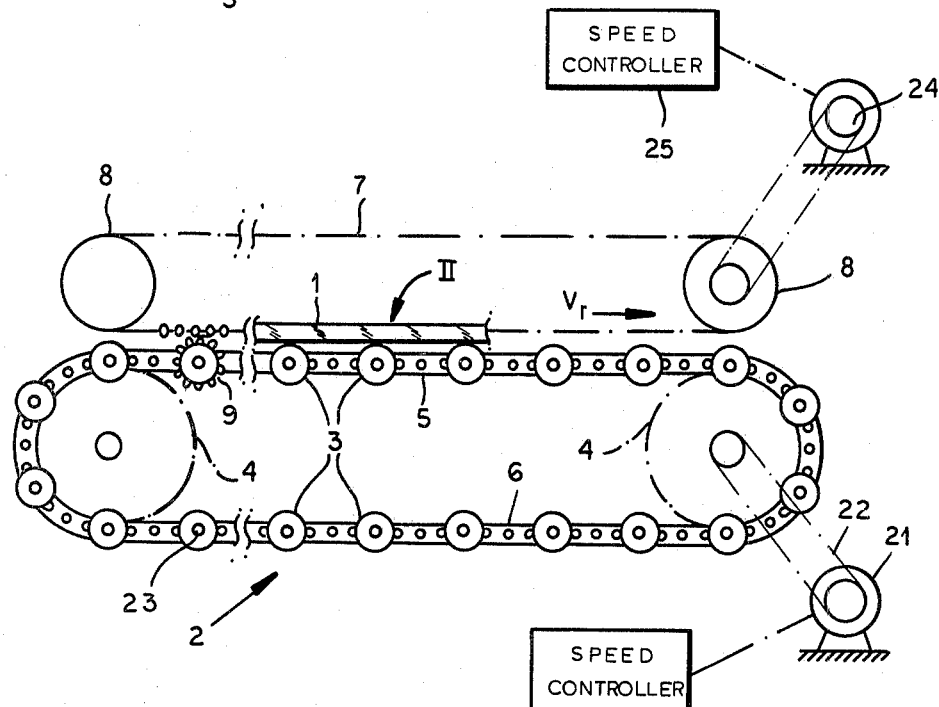
FIG. 1 is a diagrammatic elevational view illustrating the principles of a roller grate for the transport of heated glass panes, in accordance with the invention, and/or glass panes to be heated.
Figure 4:
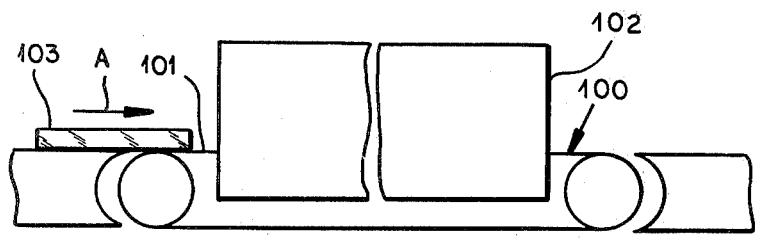
FIG. 4 is a diagram showing the application of the invention.
Figure 2:
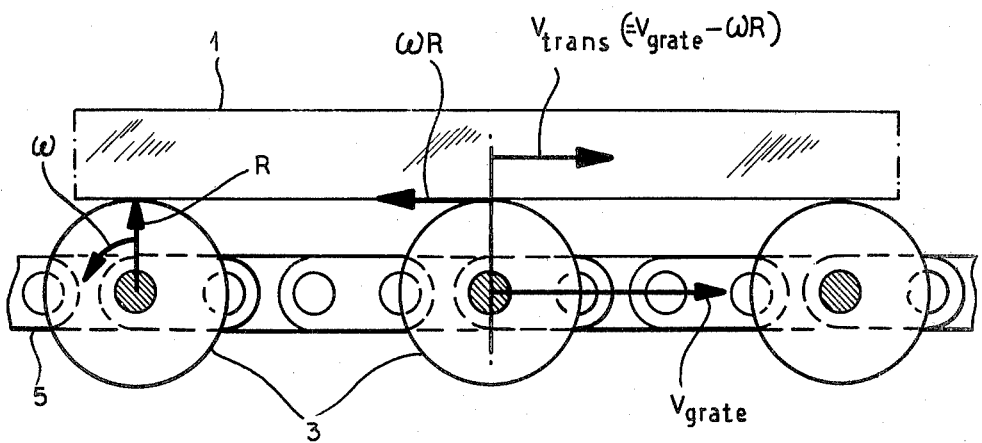
FIG. 2 is a detail view of the region II of FIG. 1.
Figure 3:
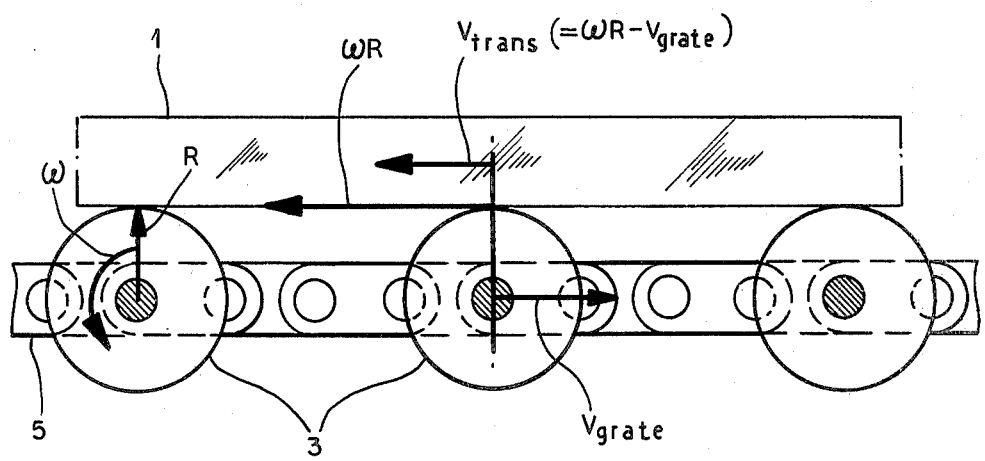
FIG. 3 is a view similar to FIG. 2 illustrating another embodiment of the invention.

As can be seen from FIG. 4, a traveling grate arrangement 100, as illustrated in FIGS. 1–3, can have its upper pass 101 traversing a treatment stage represented as a glass-heating kiln 102. The glass panes 103 are fed onto the grate 100 and are carried thereby through the kiln in the transport direction represented by the arrow A.

FIGS. 1–3 show the grate for heating the glass panes, or for carrying the glass panes which have been or are to be heated, e.g. in a prestressing system.

The roller grate 2 comprises a multiplicity of identical support rollers each having a radius R.

From FIG. 1 it will be apparent that the traveling grate 2 passes around direction-change rollers 4 and has an upper pass 5 and a return or lower pass 6. The velocity of the traveling grate is represented by the vector $V_{grate}$.

The latter velocity can be varied by a speed controller 20 regulating the speed of an electric motor 21 connected by a belt drive 22 to one of the rollers 4.

This grate velocity $V_{grate}$ is selected so that it is sufficiently large that sagging of the glass pane does not occur under the prevalent conditions.

Support rollers 3, in turn, are driven with an angular velocity $\omega$ so that the velocity vector $\omega R$ is applied to the glass panes at the location at which these panes contact the rollers.

As can be seen from FIG. 3, the vector $\omega R$ is added to the vector $V_{grate}$ to obtain the resultant translational linear velocity $V_{trans}$ of the glass panes.

In FIG. 2, $\omega R$ is in a direction opposite the direction of the grate velocity $V_{grate}$ so that $$V_{trans} = V_{grate} - \omega R,$$

$V_{grate}$ being greater than $\omega R$. In this case the glass pane moves in the direction of movement of the grate.

In the embodiment of FIG. 3, however, $\omega R$ is greater than $V_{grate}$ so that the resultant $V_{trans}$ is in the opposite direction and has a magnitude $\omega R - V_{grate}$.

In FIG. 1 the pane moves to the left, i.e. opposite the direction of movement of the grate.

To drive the rollers with the angular velocity $\omega$, a drive conveyor 7 with a linear velocity $V_r (=\omega R)$ can be used.

Figure 5:
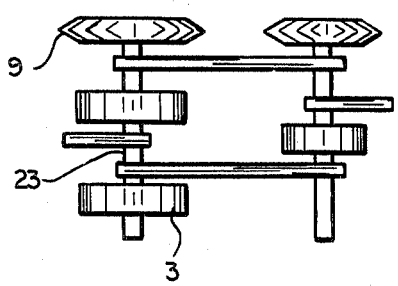
FIG. 5 is a plan view illustrating a portion of a traveling grate according to this invention.

As will be apparent from FIGS. 1 and 5, the rollers 3 spaced apart transversely across the grate 2 are keyed to common shafts 23, each shaft being provided with a sprocket wheel 9 which is engaged by the chain forming the conveyor 7, this chain passing over rollers 8 and being driven by an electric motor 24 which can also be regulated as to speed by the controller 25. The speed controller 25 can be of the direction-reversible type. Thus, any desired angular velocity can be imparted to the shafts 23 and hence the rollers.

I claim:

1. In an apparatus for the treatment of glass panes wherein a heated glass pane is displaced in a transport direction through a treatment stage, the improvement which comprises:
   a traveling endless grate having an upper pass adapted to support said panes and form with a multiplicity of rollers on which said panes rest;
   means for displacing said grate so that said upper pass moves continuously at a velocity $V_{grate}$;
   means for imparting an angular velocity $\omega$ to said rollers such that said rollers impart a velocity component $\omega R$ to said panes, where R is the radius of said rollers so that said glass pane moves through said stage without sagging at a translatory velocity $V_{trans} = V_{grate} - \omega R$, when $V_{grate}$ is greater than $\omega R$ and with a velocity $V_{trans} = \omega R - V_{grate}$, when $\omega R$ is larger than $V_{grate}$, said component $\omega R$ being in the direction opposite $V_{grate}$.

2. The improvement defined in claim 1 wherein said angular velocity $\omega$ is imparted on rollers by engaging same with a conveyor in the form of an endless member passing around direction-change rollers and driven with a linear velocity on engagement with said rollers of $V_r = |\omega R|$.

3. The improvement defined in claim 2 wherein said rollers are provided with sprockets engageable with said conveyor and having a radius R equal to the rollers of said grate.

4. The improvement defined in claim 2 wherein the grate rollers have portions of radius R engaging said conveyor.

5. The improvement defined in claim 2 wherein said velocity $V_r$ is in the same direction as the velocity $V_{grate}$.

6. The improvement defined in claim 2, further comprising central means for varying the speed of said grate.

7. The improvement defined in claim 6, further comprising central means for varying the angular velocity of said grate rollers.

8. A method of operating a roller grate for the transportation of heated panes through a treatment stage, comprising the steps of:

continuously displacing said grate at a velocity $V_{grate}$;

independently rotating said rollers at an angular velocity $\omega$ whereby said rollers impart velocity component $\omega R$ to glass panes carried by said rollers on said grate; and controlling said velocities so that $\omega R$ is in a direction opposite $V_{grate}$.

9. The method defined in claim 8 wherein $\omega R$ is greater than $V_{grate}$.

10. The method defined in claim 8 wherein $\omega R$ is less than $V_{grate}$.

* * * * *